ONE-WAY RANGE AND AZIMUTH SYSTEM FOR STATIONKEEPING

Filed Dec. 21, 1964 5 Sheets-Sheet 1

INVENTORS
LEWIS MICHNIK
FREDERICK G. REINAGEL
BY Alexander & Dowell
ATTORNEYS

INVENTORS
LEWIS MICHNIK
FREDERICK G. REINAGEL

BY Alexander & Dowell
ATTORNEYS

INVENTORS
LEWIS MICHNIK
FREDERICK G. REINAGEL
BY Alexander & Dowell
ATTORNEYS

Aug. 15, 1967 L. MICHNIK ETAL 3,336,591

ONE-WAY RANGE AND AZIMUTH SYSTEM FOR STATIONKEEPING

Filed Dec. 21, 1964 5 Sheets-Sheet 4

INVENTORS
LEWIS MICHNIK
FREDERICK G. REINAGEL

BY Alexander & Dowell

ATTORNEYS

INVENTORS
LEWIS MICHNIK
FREDERICK G. REINAGEL
BY Alexander & Dowell
ATTORNEYS 3,336,591
Patented Aug. 15, 1967

3,336,591

ONE-WAY RANGE AND AZIMUTH SYSTEM FOR STATIONKEEPING

Lewis Michnik, Buffalo, and Frederick G. Reinagel, Tonawanda, N.Y., assignors to Sierra Research Corporation, a corporation of New York Filed Dec. 21, 1964, Ser. No. 419,717
22 Claims. (Cl. 343—6.5)

ABSTRACT OF THE DISCLOSURE

A stationkeeping system for accurately determining ranges and azimuth bearings between plural mobile units, the major features thereof including follower units having time clocks and means for substantially synchronizing them with a similar clock in a master unit; the azimuth bearings being determined by means of rotating directional antennas on the units; the ranges being determined by measuring the transit times of position marking signals transmitted by the units in assigned time slots, each unit knowing the moment according to its local time clock when the other unit transmitted its signal and the moment that signal was received locally; and each unit occasionally performing a clock synchronizing function apart from the above range measuring function by interrogating the master unit and receiving a transponder reply in one time slot and accumulating a count representing the wave propagation or transit time to the master unit, and then during a subsequent time slot accumulating an additional count commencing at the moment of receipt of a master-unit signal which was initiated at the beginning of the latter time slot according to the master clock, the said second accumulated count terminating when a count corresponding with one complete time slot has been accumulated, the moment of the last accumulated count corresponding precisely with the end of the time slot in which the master unit transmitted as determined by the time clock in the master unit, and the local unit then adjusting its time clock to make the end of the corresponding local time slot coincide therewith.

The present invention relates to range and azimuth measuring systems of the type using one-way transmission of information between remotely located mobile units of the system, as distinguished from two-way range and azimuth apparatus of the pulse-echo or beacon transponder variety. More particularly, the present invention relates to a system for continuously indicating on each of a plurality of vehicle units the location of all other participating vehicles in the vicinity, especially in connection with formation-flying or stationkeeping as between aircraft.

U.S. Patent No. 3,119,107, assigned to the U.S. Government, sets forth a system which is basically similar to the present invention to the extent that it teaches the locating in space of a mobile unit with respect to a fixed search unit by employing synchronized time clocks in both units and by having the mobile unit send out pulse signals at definite instants of time so that the search unit can measure its range by determining transit time of the mobile unit's signals as measured by the fixed unit's time clock. This prior art patent also teaches occasional two-way beacon-transponder measurement of the actual range in order to permit the fixed unit to correct its time clock and thus improve the one-way range measurements. This patent also includes a good discussion of some of the advantages attainable using one-way ranging techniques as compared with two-way radar or beacon transponder measurements.

However, there is still another advantage which makes this one-way ranging system particularly useful in stationkeeping-type applications where the vehicles are operating very close together. As is well known, in two-way radar systems the "main bang" in the interrogating radar is high-powered and saturates the receiver in the same unit for some time after the beginning of the indicator sweep. Echos from nearby objects help prolong this blind period, with the result that the radar cannot perform close-up measurements in the range of a few hundred feet. This problem does not exist in a one-way system since the transmissions are all low-powered and since the receiving vehicle is not the transmitting vehicle. The only serious limitation for close-up range measuring is the accuracy to which the clocks can be maintained in precise synchronization.

The present invention extends the state-of-the-art as shown in Patent 3,119,107 to the government, and as shown in Muth Patent 3,068,473, into the field of stationkeeping between units which may be very close together, and provides improvements in the state of the art especially adapting the general principles to the specific needs.

It is a principal object of this invention to provide, in a one-way range and azimuth measuring system, efficient means for synchronizing the time-slot clocks in plural vehicles with such accuracy that the ranges between vehicles can be reliably measured within several hundred feet, or less.

It is another major object of the invention to have each slave or "follower" vehicle determine when to perform a synchronizing function with respect to the time clock located in an appointed "master" vehicle unit, and then to automatically correct its time clock to agree with the master time clock, these synchronizing functions being quite brief and relatively infrequent as compared with the range measuring function normally performed by all of the units during most of the on-time.

The present invention teaches a novel approach wherein, in addition to each assigned vehicle time slot, there is a synchronizing time slot occurring once during each complete cycle or "frame" of the time slots. The synchronizing means in any "follower" vehicle can either shorten or lengthen its synchronizing time slot in order to have the end of the synchronizing time slot in that vehicle correspond exactly in time with the ending of the same time slot in the "master" unit. This novel system in each follower vehicle includes a framing error counter into which two groups of pulses are counted during the performance of a synchronizing function, and these two groups when added together form a composite pulse series in which the last pulse occurs precisely at the end of the synchronizing time slot in the master unit.

In the presently illustrated working embodiment there are 1024 pulses occurring at a six-megacycle rate in each time slot and the range to a transmitting unit in that time slot is determined at a receiving unit by determining how many of these pulses have passed since the beginning of that time slot at the precise moment when the transmitted signal is received.

In the present system the time slots in the follower units are synchronized by first measuring by beacon-transponder the actual range to the master unit and counting a number of pulses equivalent to this range into the framing error counter and then stopping the count and waiting until the next cycle of the system. Subsequently, the second step occurs when the synchronizing time slot arrives during the next cycle, at the beginning of which slot the master unit sends out a pulse. When this pulse is received at the follower unit, it triggers the framing error counter to commence counting again, and to continue counting until the total count of 1024 pulses is reached. At this instant, when this second step is completed, the local time clock is corrected to agree with the end of the synchronizing slot, and this correction necessarily places it in synchronism with the corresponding time slot boundary of the master unit. The follower unit then reverts to performing its normal range and azimuth measurements.

Another important object of the invention is to provide a system in which each unit can determine when its directional azimuth measuring antenna is receiving signals from another unit on its main lobe, rather than on a side lobe, and to suppress side-lobe signals.

A further important object is to provide means for making each unit sensitive to direct-path signals received from other units but insensitive to reflected and undesired multipath signals.

Still another object is to provide in each follower unit means for determining when the directional antenna in the master unit is directly illuminating that follower unit, and for using this condition to trigger the synchronizing function in the follower unit while the path to the master and return is strengthened by the main lobe of the master antenna.

Another object is to provide a system transmitting only coded signals from all participating units, and efficient signal decoder means in each unit whereby interference from received outside signals can be eliminated.

A further object is to provide a system wherein each unit transmits its own position-marking signal omnidirectionally but in which the receiving units pick up the signal on a directional antenna in order to determine the azimuth angle at which they are intercepted.

It is another object of the invention to provide a "green light" circuit which controls whether the local follower unit transmits a first type of coded signal used for initiating a clock synchronizing function; or whether, because synchronization is already satisfactory, the follower unit transmits a second type of coded signal which is useful to other units in the system for performing range measuring functions to that transmitting unit, the latter signal being transmitted under "green-light" conditions.

Yet another object is to provide a system in which all units are capable of performing either in a "master" or in a "follower" mode, each unit also having selector means by which the operator can manually select the time slot in which his unit will transmit its own position marker signal. One of the principal advantages of the present system is that the time slots can be of short duration since almost all measurements are made using one-way techniques, and therefore a large number of aircraft can participate without having each obtain information so seldom that the information obtained is sparse.

Another object of the invention is to provide a system in which both coarse and fine synchronizing means are provided, whereby when the units are first tuned on aboard plural vehicles with no initial synchronization, the coarse synchronizing means will quickly bring all of the units into an initial approximate agreement, from which the fine synchronization can proceed to complete the desired time-slot synchronization.

Other objects and advantages of the invention will become apparent from the following discussion of the drawings, wherein:

FIG. 1 is a pictorial view depicting eight vehicles operating in close proximity and employing the present invention to determine their mutual bearings and ranges;

FIGS. 2*a* and 2*b* are block diagrams showing a practical embodiment of the present invention by illustrating an exemplary participating unit;

Figure 1:
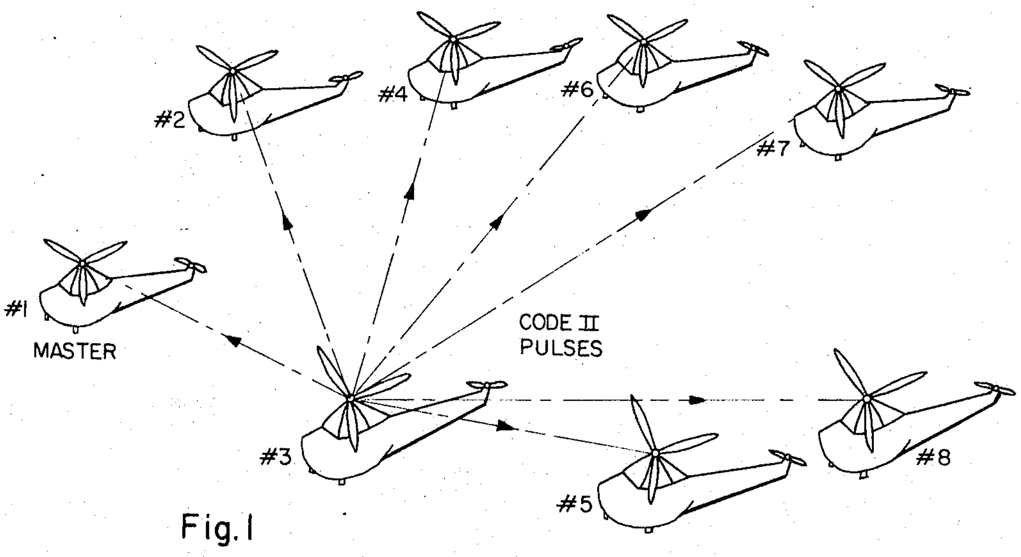

Referring now to the drawings, the embodiments illustrated are capable of performing two separate functions which are interreleated to the extent that both functions are performed sequentially during a complete operation of the system, so that they share a common time base. These two functions are: First, a range measuring function in which plural vehicles shown in FIG. 1 all equipped with similar units, measure and display ranges and azimuth directions with respect to one-another; and Second, a synchronizing function in which the time clock in each "follower" unit is accurately and periodically synchronized with the time clock in a selected one of the units which is designated as the "master" unit and whose time clock is considered the absolute standard to which all others must conform.

*Range measuring function*

The present system requires the existence of several similar units, labeled #1 through #8 inclusive, and all within mutual operating range as shown in FIG. 1. In this respect, the present system is very different from a radar range measuring system in which a single unit, by itself, can measure the distance to a remote object by pulse echo means. No "echo" technique is used in the present system while measuring range, although a two-way transponder system is used while occasionally performing the Clock Synchronizing Function as set forth hereinafter.

If it were practical to provide each of the present ranging systems with a clock which is absolutely perfect, then all of the clocks, once mutually synchronized, could be forgotten and one-way range measurements could be made very easily by having each vehicle emit a pulse at an assigned exact instant of time, so that every other vehicle in the system could determine the range to the emitting vehicle by measuring the travel time of the emitted pulse according to its local time clock. Since under the broad heading of this section of the specification the discussion is directed to the range measurement function, separately from the clock synchronizing function, it will be assumed during the discussion under this heading that no clock synchronizing is necessary.

The prior art contains patents, such as Muth Patent 3,068,473 and Maresca Patent 3,119,107, using this general one-way approach to range measurement in systems where great accuracy is not necessary. However, for present stationkeeping purposes the seriousness of the accuracy problem is illustrated by the requirement that the measurements made by the present system be accurate within 200 feet. One microsecond of error in a clock is equivalent to a 984 foot error in measured range, and therefore the present clocks must be maintained in synchronism to an accuracy of about 0.2 microsecond.

Figure 2A:
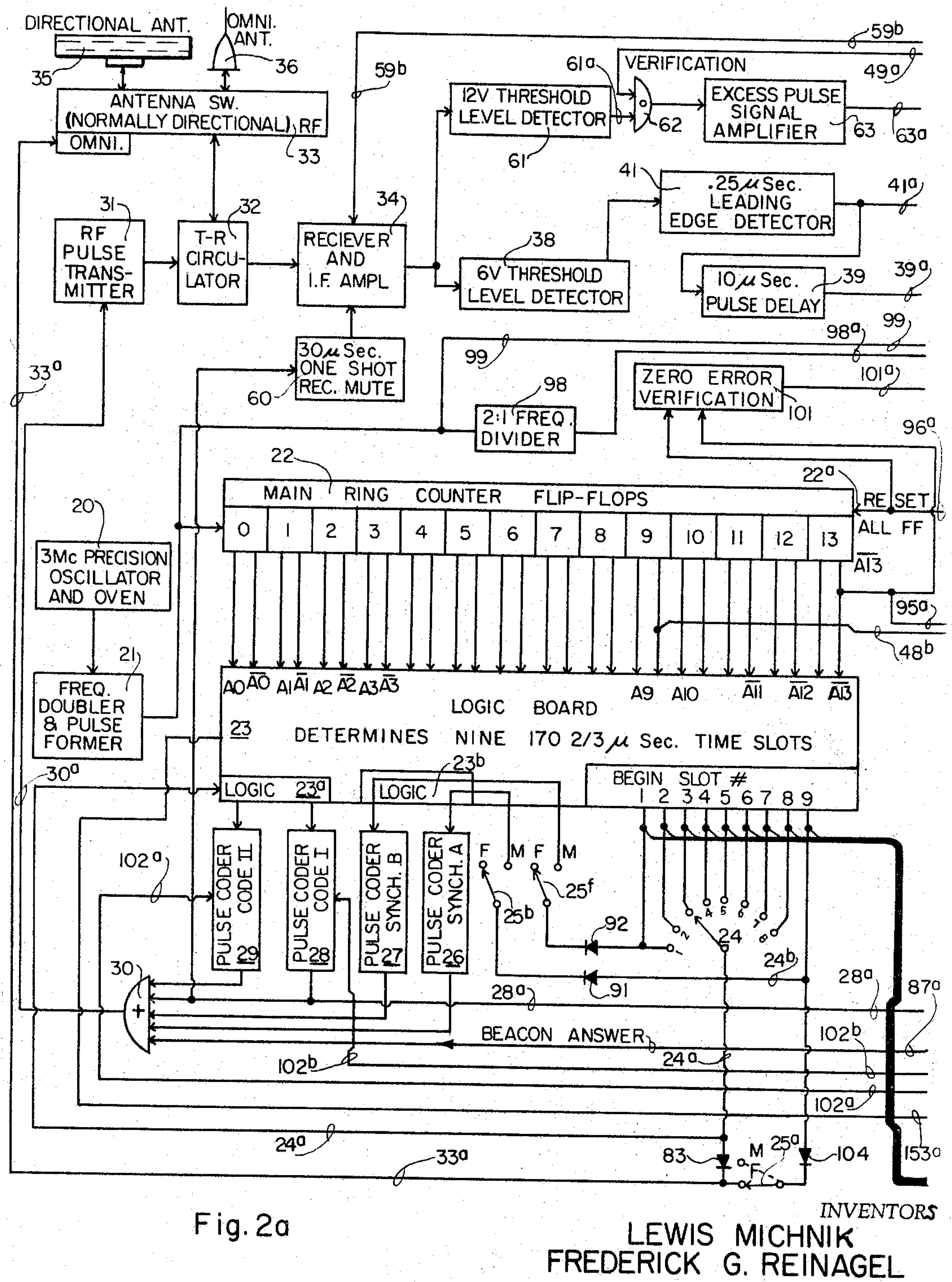
Figure 2B:
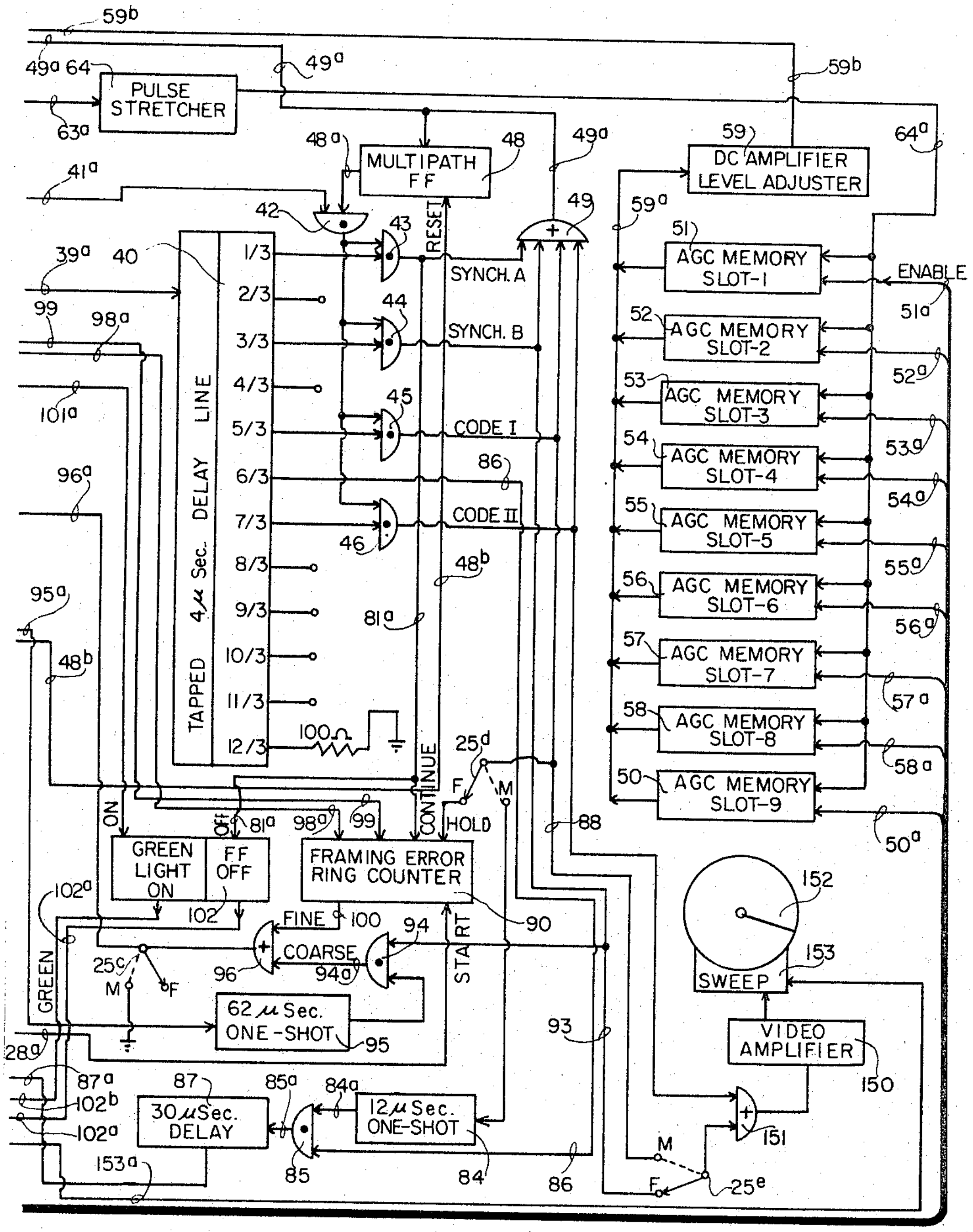

Referring now to FIG. 2, every unit in every vehicle is provided with a precision time clock including an oscillator 20 which drives a ring counter 22 at a 6 megacycle rate through a frequency doubler and pulse former 21. At the present time, a practical system would include either a crystal oscillator, a cesium beam oscillator, or a rubidium gas cell, or some other type of atomic timing device. Any one of these three devices is currently operational, although some of them are bulkier than others, and all are expensive. The practical embodiments of the present invention which are currently being flight tested have included crystal clocks operating under carefully controlled conditions.

The oscillator 20 drives the doubler 21 which in turn drives the main ring counter 22 including 14 flipflops labeled 0–13 and all connected together to form a continuous counting chain. This counting chain, upon reaching the final count indicated by an output at $\overline{A13}$ will continue by beginning again at count zero, for purposes that will appear in connection with the clock synchronizing function described below. The main ring counter 22 is also provided with a reset input labeled 22*a* and serving to reset all of the flipflops to a first condition of conductivity representing zero count. The main ring counter 22 with its 14 flipflops, when driven by pulses from the oscillator 20 and doubler 21 occurring at the rate of 6 megacycles per second, counts from zero to 1536 microseconds in ⅙ microsecond steps and then the ring counter begins counting all over again. The 28 outputs of the main ring counter 22 are labeled A0, $\overline{A0}$, A1 $\overline{A1}$, through $\overline{A13}$ inclusive, the bar over the numeral indicating the second stable conductivity condition of a flipflop as is well-known in the art. All of these outputs are delivered to a logic board 23 which controls a series of matrix gates, which use ordinary and well-known logic techniques for dividing the 1536 microsecond cycle of the main ring counter 22 into nine separate time slots each of which is 170⅔ microseconds in duration. It is to be understood that the particular numbers selected herein are arbitrary and have been chosen mainly to provide an illustrative embodiment, although these are the numbers actually used in the flight-tested prototype.

For illustrative purposes, it is assumed that the present system includes one unit as shown in the block diagram of FIG. 2 located in each of eight aircraft, FIG. 1, and each assigned a unique time slot, a ninth time slot being used by all follower units in connection with their clock synchronization functions as discussed below. For purposes of the present illustration, it is assumed that the particular unit shown in the block diagram of FIG. 2 is adjusted so that it occupies time slot #3. The "master" aircraft occupies time slot #1. The logic board 23 has nine different outputs labeled 1, 2, 3, 4, 5, 6, 7, 8, 9 and each existing for the duration of one particular time slot. Eight of these outputs are connected with the various positions of the switch 24, providing slot selection means by which the pilot of the aircraft can select any one of the eight time slots to operate in. Each system also includes a two-position switch 25 having multiple circuits, and serving to select a "master" function in one position labeled "M," or a "follower" function in the other position labeled "F."

For purposes of the present explanation of the range measuring and displaying functions, it is assumed that all of the precision clocks in all of the aircraft are precisely synchronized which means that the Main Ring Counter flipflops are synchronized and therefore the beginnings of the nine time slots in each aircraft are also synchronized. Since the present drawing illustrates the unit occupying the #3 time slot, it will be seen that the switch 24 is in the #3 position, and the master-follower switches 25*a*, 25*b*, 25*c*, 25*d*, 25*e* and 25*f* are all in the follower "F" position.

*Coded transmissions*

One of the major improvements resulting from one-way distance ranging, as distinguished from pulse-echo radar ranging, resides in the fact that only very small amounts of power need be transmitted by each of the units, and therefore in a military operation the presence of the equipment is not as prominent as it would be if higher power were required in order to obtain echos, the present system transmitting power in the neighborhood of 15 watts peak. On the other hand, it is very important that spurious signals be prevented from providing erroneous responses on the indicator unit. The present system employs coded pulse transmissions at all times so that the units of the system will be non-responsive to spurious pulses which do not exhibit the coded pulse spacings.

Figure 3:
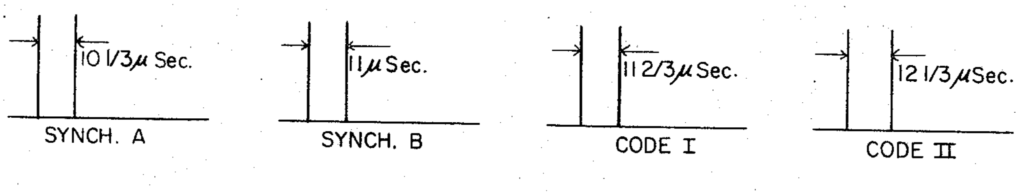
FIG. 3 is a diagram showing four coded pulse groups used in the present system.

FIG. 3 shows a diagram of suitable coded pulses which include four differently coded groups performing four different functions. It will be noted that there is a first group of pulses referred to as "sync A" pulses which include two pulses, each ¼ microsecond in duration and mutually separated by 10⅔ microseconds. These pulses are only transmitted by the master unit on its directional narrow-beam antenna, and they are transmitted at the beginning of each #9 time slot for clock synchronizing purposes as will be described below.

The master also transmits "sync B" coded pulses which are similar to the sync A pulses except that the two pulses in the pair are 11 microseconds separated from each other. These pulses are always transmitted from the master unit in time slot #1 and are transmitted only on its omnidirectional antenna. They are used by the follower units to determine their respective distances from the master unit, and they also are used by the follower units to perform a coarse synchronizing function, to be described below.

All of the units are capable of transmitting code I pulses comprising two similar pulses mutually spaced apart by 11⅔ microseconds, these pulses being transmitted directionally by the master, but being always transmitted omnidirectionally by the follower units.

The fourth group of pulses comprises code II pulses, comprising paired pulses spaced apart by 12⅓ microseconds. These pulses are transmitted only by the follower units, and are used by all other units to determine the range to that transmitting follower unit.

These four different coded groups of pulses shown in FIG. 3 are instituted by pulse coders respectively labeled 26, 27, 28, and 29 in the block diagram of FIG. 2, their outputs all being delivered to an OR-gate 30. When one of the coders delivers pulses spaced according to one of the codes set forth above in connection with FIG. 3, the spaced driver pulses pass through the gate 30 to drive the RF pulse transmitter 31 which delivers two narrow RF bursts, for example on a frequency of 3.4–3.7 gigacycles. These RF pulses are delivered from the transmitter 31 to a T–R unit 32 which in the practical embodiment of the invention comprises a microwave circulator having a branch connected to the transmitter 31, a branch connected to the antenna switching unit 33, and another branch connected to the receiver 34, all of these units being well-known in the radar art.

Each aircraft is equipped with two different antennas including a rotating directional antenna 35 and an omnidirectional antenna 36. In the present example employing helicopters the directional antenna is carried by the rotor hub and is connected to the T–R unit 32, but when an input is delivered to the antenna switching unit 33 along the wire 33*a* the omnidirectional antenna 36 is connected to the T–R unit 32. Ordinarily, the directional antenna 35 is operative unless the wire 33*a* is energized. The antenna switching logic by which this is accomplished will be described hereinafter.

If it were not necessary to ever synchronize the time clock means in the various units, a single group of coded pulses, namely code II, would be adequate for the ranging requirements. Each aircraft would transmit omni code II pulses at the beginning of its own time slot (time slot #3 in the present block diagram), and all the other aircraft would receive this coded pair of pulses and reckon the range to the transmitting aircraft by noting how many microseconds after the commencing of time slot #3 the code II group of pulses were received.

The output of the receiver 34 includes a decoder, described hereinafter, which renders the system sensitive only to pulses received which have the proper coded mutual spacings. The measurement of the azimuth position of the aircraft transmitting in time slot #3 is determined by each of the listening aircraft by the position of its own directional antenna 35 at the moment when this code II group is received on the main lobe of the antenna. In the working embodiment of the present invention the antennas 35 in each of the aircraft rotate at about 200 revolutions per minute, and this rotation rate permits each aircraft to receive three ranging pulses from each of the other aircraft during each rotation of its own antenna.

When a receiver 34 in one unit receives a transmission from any other unit, the output of the receiver passes through a pulse decoder including a threshold level detector 38, a pulse leading edge detector 41, a delay unit 39, a four microsecond delay line 40 tapped at ⅓-microsecond intervals, an AND-gate 42 and a plurality of gates 43, 44, 45, and 46, all of which cooperate in the following manner to determine whether any of the received signals comprises one of the four coded groups shown in FIG. 3. The threshold detector 38 serves several different purposes, one of which is of interest in the present discussion. This level detector eliminates all signals from the receiver below an arbitrary amplitude level, selected as six volts, and thereby makes the system sensitive only to signals which are above the noise level. This function serves mainly to eliminate noise signals having no useful information.

The received signals are delivered to the unit 41 which delivers a very sharp output pulse of 0.25 microsecond duration at the leading edge of every input pulse having more than six volts amplitude, and these pulses are delivered to the AND-gate 42. Assuming the correct input to the gate 42 from the multipath flipflop 48, as will be explained later, this gate 42 will pass these narrow pulses to the adjacent AND-gates 43, 44, 45, and 46 to enable one input to each of these gates, substantially at the same time that any pulse passes through the receiver.

The pulses delivered from the leading edge detector 41 are also channeled down another path to the delay circuit 39 which delays them by 10 microseconds as compared with the time the same pulse arrives at AND-gate 42. The pulses from the delay circuit 39 then pass into the tapped delay line 40 where the fractional delays shown in the box 40 of the drawing are added to the 10 microsecond pulse delay provided by the circuit 39. Thus, pulses appearing at the lower input of gate 43 are 10⅓ microseconds delayed from the arrival time of the pulses at the input to the gate 43 from the gate 42.

The way in which these pulses are decoded can be seen by considering the arrival time of the pulses at the gate 43 through two different routes. If a coded pair of sync A pulses is delivered by the receiver through the threshold detector 38, the gate 43 will be enabled to deliver an output in the form of a single pulse representing reception of a sync A pair, and this single pulse will be delivered to the OR-gate 49 in the following way. The coded pair of pulses received are assumed to be spaced by 10⅓ microseconds, and the first of these two pulses will pass through the leading edge detector 41 and the gate 42, but cannot enable the gate 43 because no input is appearing yet at the lower input to the gate 43. Therefore, the first pulse passing through the gate 42 does nothing. The second pulse follows 10⅓ microseconds behind the first pulse and it arrives at the gate 43 at just the right moment to enable the gate in cooperation with a pulse from the first tap of the delay line 40. The pulse from the first tap of this delay line corresponds in reality with the first of the paired pulses which was received, it being delayed 10 microseconds in the circuit 39 and ⅓ microsecond in the delay line 40. The second pulse of the pair also can pass through the delay 39 and the line 40, but it arrives too late to be useful. Thus when a sync A coded pair of pulses passes through the receiver 34, the first pulse, delayed in the circuits 39 and 40, arrives at gate 43 at the same time as the undelayed second pulse through the detector 41 and the gate 42. Thus, a sync A input to the receiver is uniquely identified by a single output pulse from the gate 43.

The sync B pulses are spaced 11 microseconds apart and the circuits 39 and 40 together provide an 11 microsecond delay to bring the first pulse of the coded pair into coincidence with the second pulse which passed through the detector 41.

When a code I pulse group appears at the receiver 34 it is uniquely identified by an output at the gate 45 at the 5/3 tap of the delay line 40, corresponding with 11⅔ microsecond spacing between the pulses of the code I group.

Similarly, the 12⅓ microsecond spacing between code II pulses results in an output from the gate 46, after delaying the first pulse in the code II group by 7/3 microseconds in the delay line 40 in addition to 10 microseconds in the delay circuit 39 to bring the first code II pulse into coincidence with the second code II pulse from the gate 42.

The output signals from the gates 43, 44, 45, and 46 comprise in each case a single 0.25 microsecond pulse which is delivered through the OR-gate 49 to the multipath flipflop 48 to reverse its condition of conductivity to prevent reception of another pulse pair in the same time slot, as will be discussed below. Some of these outputs from the gates 43, 44, 45, and 46 also travel downwardly to operate time-clock synchronizing circuitry to be discussed hereinafter. Sync B outputs as well as code I outputs and code II outputs, are delivered to a video amplifier 150 through a switch 25*e* and the OR-gate 151, to be displayed upon a PPI indicator 152 in a manner well-known per se. The PPI 152 is provided with sweep circuits 153 which are triggered at appropriate intervals by an output from the logic board 23 along the wire 153*a*. When the unit operates as a "master" station, it displays code I signals and code II signals from all other aircraft. The master also displays code I signals because each follower transmits these, instead of code II signals when the main lobe of the master antenna 35 is directed at the follower unit since at that time the follower units are respectively performing their clock synchronizing functions. On the other hand, when the unit operates as a "follower" unit, it displays sync B signals from the "master" unit and code II signals from the other "follower" units.

*Multipath suppression*

When any of the coded signals is decoded so that an output pulse is delivered from one of the gates 43, 44, 45, or 46, such a pulse is delivered to the OR-gate 49 which in turn delivers a pulse to the "verification" wire 49*a* to verify the receipt of a coded signal. This verification performs several functions. The verification signal on the wire 49*a* trips the bistable flipflops 48 into a condition of conductivity such that the signal is removed from wire 48*a*, thereby blocking the gate 42. When the gate 42 is blocked, the decoder system is also blocked so that no further output can be had from any of the gates 43, 44, 45, or 46 during that time slot and until the multipath flipflop 48 is reset. This resetting takes place at the beginning of each of the nine time slots by a signal on wire 48*b*. Thus, it can be seen that the multipath flipflop operates to disable the decoder for the remainder of each time slot after a decoded pulse pair has been received. It will also be noted that the verification signal on wire 49*a* is delivered to enable an AND-gate 62 in the top central portion of the drawing. The function of this gate will be hereinafter described.

With respect to the resetting of the multipath flipflop 48, this is accomplished by a signal introduced on the wire 48*b* and taken from the $\overline{A9}$ output of the ring counter 22. In the particular logic board 23 used in the present working embodiment, the time of occurrence and the predetermined length of each of the various time slots is derived from the outputs of the flipflops labeled 10, 11, 12 and 13, and $\overline{10}$, $\overline{11}$, $\overline{12}$ and $\overline{13}$. These time slots are determined by a series of AND-gates (not shown) each having four inputs, and these inputs being connected in varying combinations with the above-mentioned eight outputs of the flipflops 10, 11, 12, and 13. Therefore, as the counter 22 is counted upwardly, the output $\overline{A9}$ of flipflop 9 will be energized in the counting sequence substantially at the beginning of each new time slot, and the output from $\overline{A9}$ therefore is conveniently connected to the multipath flipflop 48 to reset it so that it will apply an enabling signal to the wire 48*a* before the beginning of each new time slot.

*Side lobe signal suppression*

Whenever a vehicle sends out a code II signal in its own time slot to be picked up by another vehicle and displayed on the latter's PPI for the purpose of indicating the location of the transmitting aircraft, the azimuth information is supplied by the directional antenna in the receiving vehicle, which antenna determines the direction from which the code II signals are emanating. If the directional antennas were perfectly directional, and if there were no multipath signals arriving, the determination of the azimuth angle of the arriving code II signals would be non-ambiguous. The multipath flipflop 48 described in the previous section goes a long way toward taking care of the range multipath problem, but it does not contribute any help toward distinguishing signals received on a side lobe of a directional antenna, due to azimuth multipath, from signals received on its main lobe. A solution to this problem is described in detail in Fletcher Patent 3,153,232 which employs a separately stored AGC level corresponding with each of the assigned vehicle time slots, and wherein the main logic board in each aircraft switches the different stored AGC levels into the receiver in the proper time slots. This disclosure also includes another necessary capability, namely, means for re-educating the stored AGC memory every time a signal is received from the vehicle occupying the particular time slot with which that AGC memory is associated. In this way, the receiver bias level is altered during each time slot so as to make the receiver sensitive to signals of approximately the same intensity as the last signals received from the same vehicle. Because of the fact that side lobe signals are always weaker than main lobe signals, the side lobe signals will be overlooked by the receiver whose threshold level of sensitivity is set by the AGC to discriminate against the weaker side lobe signals.

The means illustrated for accomplishing stored AGC level for each time slot is as follows: Nine AGC memories 50, 51, 52, 53, 54, 55, 56, 57 and 58 are required in an eight vehicle system. These nine memory units are sequentially enabled by the wires 50*a*, 51*a*, 52*a*, 53*a*, 54*a*, 55*a*, 56*a*, 57*a*, and 58*a* which are respectively connected to outputs 1 through 9 of the times-slot logic board 23. There are two other wires connected to each AGC memory device 50–58. These include an output wire connected to the input of the DC amplifier 59 through the lead 59*a*, and an input memory correcting lead 64*a* through which the AGC memory is re-educated to the then-existing signal level transmitted in that particular time slot.

Figure 5:
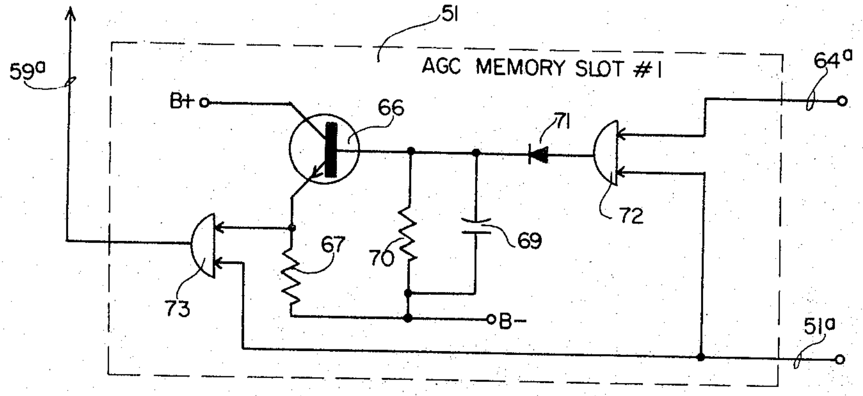
FIG. 5 is a schematic diagram showing one automatic gain control (AGC) memory circuit of the type used in FIG. 2.

FIG. 5 shows a typical AGC memory circuit which includes a transistor emitter follower 66 having an emitter resistance 67 and having its collector connected to a plus battery source. The base of the transistor 66 is connected to a storage capacitor 69 which is continuously but slowly bled off by a resistor 70. The RC time constant of the resistor and capacitor is long compared with the rate of input pulses through the coupling diode 71. In the first time slot the wire 51*a* is energized to enable the gates 72 and 73 so that the AGC level at the emitter of the transistor 66 is read out through the wire 59*a*, while at the same time the level of the capacitor 69 is being re-established through the wire 64*a*.

When a coded signal is received at the receiver, it is delivered not only to the six volt threshold detector 38 for purposes of examining whether the received signal meets one of the four different code requirements, but a portion of the signal is also delivered to a 12 volt threshold level detector 61. This detector passes only a portion of a signal which exceeds 12 volts and delivers this excess portion of the signal to the AND-gate 62. If the decoder system finds that the received signal meets one of the four different code requirements, so that a pulse is delivered along verification wire 49*a* to the AND-gate 62, the remaining duration of the received signal which is in excess of 12 volts and which is delivered to the gate 62 by way of the wire 61*a* passes through the enabled gate 62 and into an amplifier which amplifies this excess amplitude of the pulse exceeding 12 volts and delivers it to a pulse stretcher 64 which converts this excess output into a long pulse, for instance in the vicinity of about 100 microseconds, whose amplitude is proportional to said excess. This longer pulse is then applied through the wire 64*a* to re-educate the DC level in the AGC memory device in the time slot in which it is currently enabled. As pointed out above, each AGC memory comprises a storage capacitor 69 serving as a means from which the charge is continuously leaking at a rate controlled by resistance 70. Thus, if the strength of a received signal is increasing, the 12 volt threshold detector 61 will keep adding a charge to the storage capacitor 69 to raise its level. On the other hand, if the received signals from a particular vehicle are decreasing as time goes by, the 12 volt threshold level detector 61 will continuously reject the entire signal level sent to it by the receiver 34, and the charge in the AGC storage capacitor 69 will leak off and diminish until it has fallen enough to raise the received sensitivity so that it will begin passing signals through the level detector 61. The DC amplifier 59 also includes a level adjuster in the form of a potentiometer (not shown) which can be adjusted to set the operating point of the AGC delivered through the amplifier 59 to the receiver 34 along wire 59*b* to an operating point at which the receiver noise output is just below the 6 volt level.

*Synchronization function*

There are time clocks in all of the vehicles involved in the present system, and they must all be synchronized to a degree of accuracy in which the error does not exceed, in this example, ⅙ microsecond. One of the vehicles is designated as the master and the other vehicles are all designated as follower vehicles. Every vehicle is capable of operating in either a master or a follower mode by selection of the desired position of the ganged switches 25*a* through 25*f*. The clock in the master vehicle is regarded as absolutely correct under all normal circumstances, and the clocks in all of the other vehicles are periodically corrected to make them agree with the master clock.

In view of the tremendously close synchronization which is necessary in order to make the present invention useful for stationkeeping purposes during formation flying where there may be only a few hundred feet between adjacent vehicles, the synchronization of the clocks with the master clock must be regularly accomplished. As pointed out in the objects of this invention, one of the principal advantages of measuring range by one-way transmission techniques, as described in Maresca Patent 3,119,107 and as distinguished from two-way radar-type operation as described in Fletcher Patent 3,153,232 resides in the fact that all of the time slots can be made considerably shorter so that more measurements of aircraft location can be accomplished within a given time, or so that more aircraft can participate in a given system without having each vehicle perform its ranging function so infrequently that the quality of the information which it obtains and displays on its indicator unit becomes too sparse. As the stability of flyable clocks is improved, it will become possible to have the synchronizing function performed less and less often, and eventually it may even be possible to eliminate in-flight synchronization. However, at the present stage of development, it is abundantly adequate and also convenient to synchronize each follower unit once every revolution of the master vehicle's directional antenna which, as stated above in this illustrative embodiment, rotates at the rate of 200 revolutions per minute. When synchronization is performed this frequently, a good three megacycle crystal oscillator with temperature and voltage stabilization is sufficient, and this combination makes a good practical system.

In the present system, synchronization is performed by each follower vehicle once every revolution of the master vehicle's directional antenna, each such synchronization being performed during the interval of time when the directional master antenna is directed toward the particular vehicle performing synchronization. The performance of synchronization while the master antenna is pointed at the synchronizing vehicle insures that there will be a strong signal path between the master and the synchronizing vehicle.

Stated briefly, the present invention contemplates the following synchronizing technique. The master vehicle sends out a sync A signal on its directional antenna at the beginning of time slot #9 during each time slot cycle. Each unit in the present system is provided with AGC means 50 for determining whether the directional antenna was pointed at the particular follower vehicle, for instance the vehicle occupying the time slot 3 of the present illustration. If the directional antenna on the master is illuminating the follower vehicle which occupies time slot #3 a switch means 102, to be described hereinafter, is actuated to discontinue the normal range measuring functions of the system and to cause the system to measure the distance from the master to the follower vehicle 3 under discussion by two-way transponder technique. The vehicle in slot #3 uses this measurement in a novel way to correct its own time clock. During this two-way technique for measuring the range to the master, the follower vehicle #3's time clock oscillator participates only to the limited extent of advancing the framing error ring counter to record the two-way measured range, whereas by the one-way range measuring system the unit #3 time clock and main ring counter comprise the "yardstick" of the measurement. The difference between these two different types of range measurements between the same vehicles, performed in rapid succession, constitutes a direct measure of the amount of drift of the time clock in vehicle #3. Once this error has been determined, there are two possible ways of using it to correct the drift. One way is to supply a correction voltage to the crystal oscillator 20 as described in connection with FIG. 6, this voltage tending to drag the frequency of the clock oscillator 20 in a direction which will reduce the error. The other way of correcting this error is to allow the oscillator 20 to continue running unchanged without attempting to correct its frequency, and then reset the main clock counter 22 to zero at a certain place in its counting cycle, as shown in FIG. 2. Both means will be described hereinafter.

*Correcting the counter*

When performing ordinary ranging functions during most of the time, the test systems transmit various coded signals as follows. The master vehicle transmits from its directional antenna sync A signals at the beginning of every #9 time slot. These sync A signals are never displayed by any of the PPI units since they are used only in connection with synchronizing, but they are transmitted in every #9 time slot because they are the coded signals by which each remote follower vehicle determines whether it is being illuminated by the main lobe of the directional antenna 35 on the master, from which information the follower vehicles determine whether or not to perform a synchronization function. The master unit transmits sync B signals marking its position at the beginning of its #1 time slot. Moreover, sometimes the master also transmits code I signals directionally but only as a triggered beacon response when interrogated by code I signals from a follower vehicle. The master does not transmit code II signals at all.

Each follower unit transmits the following signals: The most commonly transmitted signal is the code II signal which is transmitted at the beginning of the vehicle's own assigned time slot, and is picked up by the other vehicles which use these code II signals to locate the transmitting vehicle with respect to both range and azimuth. This signal is therefore always transmitted omnidirectionally. The only other signal transmitted by a follower station is a code I signal transmitted omnidirectionally at the beginning of the vehicle's own time slot, but only when the vehicle is performing a clock synchronizing function instead of a range function. The code I signals trigger a transponder in the master vehicle so that it sends back a beacon response which is used by the interrogating vehicle to measure the distance from itself to the master station for purposes of comparing this accurate two-way beacon-type range measurement with its own one-way measurement of range to the master, so that its local clock means can be adjusted to eliminate any discrepancy between the one-way measurement and the two-way measurement. The follower vehicles never transmit either sync A or sync B signals.

As stated above, the ranging function is performed most of the time, and the synchronizing function is performed only occasionally, and then only for a very brief interval. In the present example, there are nine time slots constituting each frame or cycle of the system, each time-slot including 170⅔ microseconds, and each cyclic frame including nine slots and 1536 microseconds, and the frames are repeated at the rate of 650 per second. The antenna 35 rotates 200 times per minute, and the directional antenna 35 on the master unit delivers one sync A pulse per frame in the ninth slot. If each vehicle performs one synchronizing operation per revolution of the master directional antenna, it will mean that out of the 650 times per second its time slot becomes available to it, only two of these time slots are used for synchronizing as will be seen hereinafter. The synchronizing occurs over two consecutive cycles of the system for each vehicle performing this function. It is therefore apparent that clock synchronization, timewise, represents only a very brief instant for each follower unit.

Each follower unit performs a synchronizing function each time the master directional antenna illuminates that particular follower unit. It is the sync A pulses from the master unit decoded on wire 81*a* in the follower unit #3 which control the switching of this follower unit from its normal ranging function to its clock synchronizing function using the flipflop 102 to control the switching. At the beginning of each #9 time slot the master sends out a sync A signal which if directed at unit #3 will put a pulse on wire 81*a* and turn the flipflop 102 "off," so that an output appears on wire 102*b* to enable the code I pulse coder 28. Since no output appears at this time on wire 102*a*, the code II encoder 29 is disabled. Hence, when the #3 time slot arrives, unit #3 transmits code I instead of code II signals. The encoder 28 is actuated by an output on terminal #3 of the switch 24 delivered on wire 24*a* to logic 23*a*. The output of encoder 28 is delivered through gate 30 to drive transmitter 31 to deliver code I pulses through the T–R circulator 32 and into the antenna switch and to the appropriate antenna. A part of this output on wire 28*a* is also delivered to trigger a 30 microsecond mute 60 which prevents any output from the receiver 34 to eliminate any echos reflected from nearby objects. An output is delivered from the encoder 28 through wire 28a to "start" the framing error counter 90 counting for the purpose to be hereinafter discussed. Moreover, an output is also delivered from the switch 24 through the blocking diode 83 and into the line 33a to switch from the directional to the omnidirectional antenna 36 for transmission of these code I pulses. The master unit receives the code I pulses, and when decoded in the master unit the resulting pulse travels down wire 88 through the switch 25d (which in the master is set in the "M" position) and into the 12 microsecond one-shot 84. The output on wire 84a from the 12 microsecond one-shot enables the AND-gate 85 which during its presence can pass both pulses of the received code I pair which arrive thereat through the 6/3 tap of the delay line 40 in the master unit. These pulses, still code I in spacing, then travel along the wire 86 and through gate 85. Thus, a signal appears at the output 85a and is fed into the 30 microsecond delay line 87. 30 microseconds later and still in the master unit, the code I pulse pair emerge on the wire 87a, and are delivered to the input of the OR-gate 30. The output of the OR-gate 30 then drives the master transmitter 31 to deliver a code I pulse pair, this time to its directional antenna since the wire 33a in the master is not energized during time slot #3. Notice that the master unit thereby performs a transponder reply, not in its own time slot, but in the time slot #3 of the interrogating follower unit. Since the entire synchronizing function occurs while the directional antenna of the master unit is directed at the synchronizing unit 3, the use of the directional antenna on the master to furnish the transponder reply insures a greater signal strength than would be furnished by omnidirectional signal transmissions. It is also important to note that the transponder reply of the master unit is always delayed by 30 microseconds by the master's delay line 87 prior to replying to the interrogating follower unit. This is for the purpose of waiting until undesired large echoes from ground clutter which might be returned to the interrogating follower have died down, such code I echoes might otherwise be decoded by it erroneously in place of a code I reply furnished by the master. A 30 microsecond delay eliminates large ground clutter echoes from the system, and any small echoes will be eliminated by the threshold detectors 38 and 61.

When the master unit sends out its code I transponder reply after a 30 microsecond delay, the reply is received at the omnidirectional antenna 36 of the follower unit #3, which is always actuated in time slot #3 through diode 83, and this reply is decoded to provide an output at gate 45 which output in the follower unit travels down the wire 88 into the switch 25d and into the "hold" terminal of the auxiliary time measuring means comprising the framing error ring counter 90, the operation of which is about to be described.

At this moment, the follower unit has just completed a beacon-type two-way measurement of the range to the master unit, and this information has been stored in the form of clock pulses counted into the framing error ring counter 90 at a 3 megacycle rate taken from wire 98a. The next time that the #9 time slot comes up near the completion of that frame, the master unit transmits its normal sync A pulse, and the follower unit #3 receives this pulse and again uses this pulse to commence the framing error ring counter 90 counting, but this time at a 6 megacycle rate from the doubler 21 on wire 99. As soon as the total count in the counter 90 reaches 1024, the counter 90 generates a clock synchronizing pulse and delivers it on wire 100.

Note that the two-way ranging information contained in the ring counter 90 includes no error attributable to the follower unit #3's time clock except to the extent that pulses from the clock were used to record the range measurement. The precise manner in which time slot correction is accomplished according to the system is as follows.

*Framing error ring count*

Figure 4:
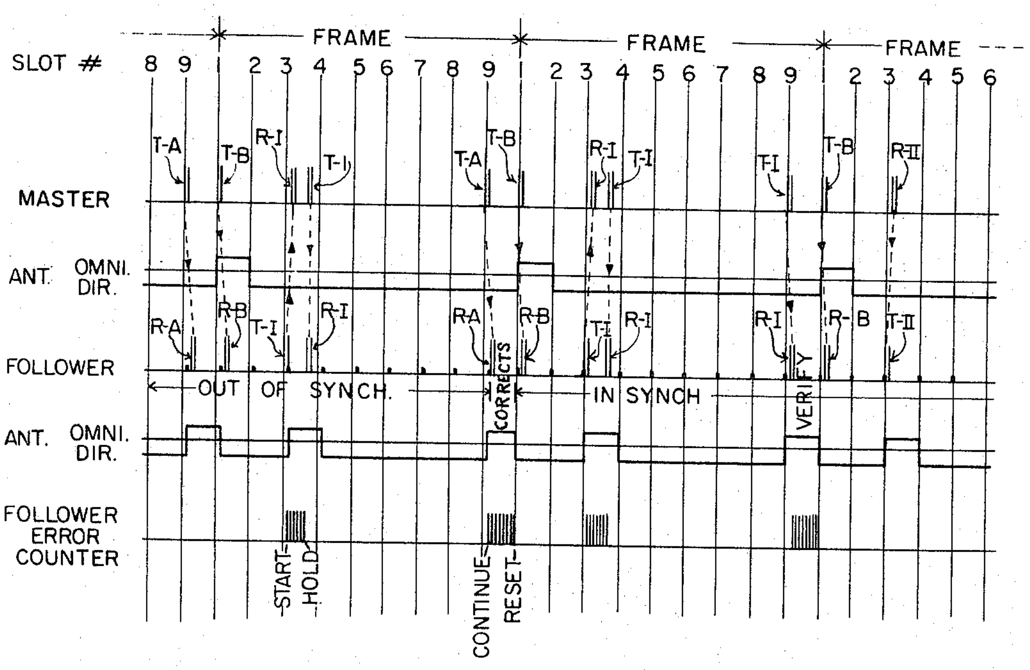
FIG. 4 is a sequence timing diagram showing several complete time-slot cycles, each including nine time slots, and showing the coded pulses which are transmitted and received by the master unit and the #3 time-slot follower unit during the illustrated cycles as well as their antenna switching functions.

Carrying the synchronizing function through from the moment when the directional antenna of the master unit directly illuminates the follower unit #3 with sync A pulses, and thereby actuates the flipflop 102 through wire 81a to change the follower unit from the ranging function to a clock synchronizing function, the sequence is as illustrated in FIG. 4.

It was the transmission by the master of a sync A coded pair at the beginning of slot 9, near the upper left-hand corner of FIG. 4, which caused the follower unit 3 to commence its synchronizing cycle, assuming that the directional antenna 35 on the master unit was facing follower #3. Inside of the master unit, when time slot 9 occurs, an output is delivered along the wire 24b through blocking diode 91 and through switch 25b and logic circuit 23b to initiate the transmission of sync A signals by its pulse coder 26. A brief time then passes, and later in the cycle when the time slot #1 commences, the master unit sends out through blocking diode 92 and switch 25f an additional signal which causes the pulse coder 27 to send out sync B signals to drive the master transmitter 31. The output from switch 24 (in the #1 position in the master) through blocking diode 83 to wire 33a makes this transmission of sync B signals omnidirectional.

In the follower #3 unit the sync B pulses are received and decoded to provide a pulse from gate 44 which is displayed on the PPI 152 by way of wire 93 and switch 25e. The decoded sync B pulse from the wire 93 is also delivered to the AND-gate 94. Output $\overline{A13}$, which substantially corresponds to the beginning of slot #1, triggers a 62 microsecond one-shot 95 which is connected so that it disables the gate 94 for 62 microseconds during time slot #1, the 62 microseconds being long enough to permit reception of sync B pulses from the master at any range within the capability of the system, assuming correct time slot synchronization. However, code B signals can be transmitted via wire 94a whenever not received during the first 62 microseconds of time slot #1. If code B signals are transmitted on wire 94a, this provides a "coarse" reset signal which passes through the OR-gate 96 and along the wire 96a to reset all of the flipflops in the main ring counter to zero provided the switch 26c is on "F" and therefore does not short-out the signal on wire 96a. Stated another way, if the slot assignment by the follower's main ring counter 22 is substantially different from the slot assignment by the counter in the master unit, the sync B signal will arrive during other than the first 62 microseconds of slot #1 during which interval the gate 94 is disabled by the one-shot 95, and the output on wire 96a will set the ring counter 22 back to zero again, thereby partially correcting the error. Coarse resetting usually occurs only during early stages of synchronization after initial turn-on.

Nothing more happens until time slot #3 arrives, and during this time slot, as described above a slot #3 output from the switch 24 along the wire 24a to logic 23a enables the code I and code II pulse coders. This slot #3 output also connects the omnidirectional antenna 36 to the transmitter 31 through diode 83. The sync A signal just preceding turned the flipflop 102 off, thereby energizing wire 102b to provide an output from the pulse coder 28 which travels along wire 28a and starts the framing error ring counter 90 counting clock pulses at a rate of 3 megacycles from the wire 98a. The clock oscillator 20 runs at 3 megacycles; is doubled to six megacycles by the doubler 21, and is again halved by divider 98. Although re-dividing may appear unnecessary, the pulse phasing is more nearly correct when done this way since the output of the oscillator 20 is a sine wave and not pulses, until after the pulse former 21.

The framing error counter 90 continues the count at a three megacycle rate until it receives back a code I transponder signal from the master unit which is decoded to provide a pulse output to the gate 45 on the wire 88. This output is passed through the switch 25*d* in unit #3 and actuates the "hold" input to the framing error counter 90 to stop it counting. The number of pulses counted into the error ring counter 90 at this instant represents the one-way range from the follower unit #3 to the master unit as measured by a beacon-transponder function, plus the thirty-microsecond delay introduced by the master unit delay circuit 87. The reason for the 2:1 frequency divider 98 giving a three megacycle rate is that the range represented by transit time was actually measured twice since the transponder signal has traveled both ways to complete a ringaround. In addition, however, the 30-microsecond delay supplied by the delay unit 87 in the master has been measured in the follower unit counter 90 by pulses occurring at only one-half the normal pulse rate of six megacycles. Thus, the number of pulses actually counted into the error ring counter 90 is equivalent to a one-way range between the two vehicles plus this fixed delay. The framing error ring counter actually used in the working embodiment was compensated to remove this fixed delay so as to thereby leave only a total number of pulses accurately representing the true range one-way between the units.

Although the time clock in the follower unit 3 was actually used to count into the counter 90 the pulses representing the beacon-measured range, thereby possibly introducing a very small error if the oscillator frequency was not perfect, it is assumed that the rate of count of the clock is substantially perfect over brief intervals, and that the error which is being corrected by the present synchronizing process is primarily a cumulative error occurring over the 300,000 microseconds between synchronizations. Thus, it can be seen that in the few microseconds counted by the oscillator 20 in measuring one two-way beacon range to the master, the error would be within a one-sixth microsecond interval which is the least unit of time which can be counted by the present system.

In summary, the end of the #3 time slot has been reached, and a beacon function has been performed on the master by follower unit #3, which has counted a number of pulses into its error ring counter 90 which represents true one-way range to the master, and then the error ring counter 90 has been halted temporarily by the "hold" signal from the switch 25*d*. Nothing happens for synchronizing purposes for the remainder of this particular frame until at the beginning of the ninth slot the master unit again comes on the air as described above and delivers a pair of sync A pulses, which are received at the follower unit #3 and decoded to provide an output at gate 43 and along wire 81*a*. The signal on wire 81*a* actuates the "continue-counting" input to the framing error ring counter 90, but this time the count is made at the full clock pulse rate obtained from wire 99. The error ring counter 90 continues counting pulses and adding these pulses to the earlier count made in time slot #3 as set forth above in connection with two-way range measurements, and this new counting is continued by the framing error ring counter until a total count of 1024 pulses (one time slot) has been arrived at, it requiring 1024 six-megacycle pulses in order to represent 170⅔ microseconds which is the length of one time slot. When the 1024th pulse has been counted, the framing error ring counter 90 delivers an output through the wire 100 to the OR-gate 96 and along the wire 96*a* to reset the main ring counter flipflops 0–13 inclusive to zero. In this way, the accumulated time clock error in the main ring counter 22 has been precisely eliminated and this elimination has occurred by changing the length of time slot #9 in the follower unit #3 so as to force the beginning of time slot 1 to begin on time as shown in FIG. 4.

The understanding of the manner in which this synchronization has been accomplished can be aided by stating what has actually occurred in a different way. Thinking of the time slot #9 as being standard in the master unit, but as being elastic in each follower unit, so that the end of the time slot #9 in a follower unit can be stretched or compressed in order to make it end at exactly the last count before the beginning of time slot #1 in the master unit, the present approach further divides this elastic time slot into two portions. Remember that 1024 pulses must be counted into the error ring counter 90 in order to make one complete #9 time slot bridging the gap from the end of time slot #8 to the beginning of time slot #1. It is known that the master unit transmitted a sync A signal at the beginning of the time slot #9. This time slot signal should be received at follower unit #3 a certain number of microseconds later depending upon the range separation between the master unit and unit #3. We have already determined this range with accuracy by two-way measurement and have counted as many pulses as are required to accurately represent this range into the counter 90, this having been done in connection with the beacon transponder measurement of range just described above, which measurement occurred during the previous #3 time slot and ended by actuating the "hold" input to the error ring counter 90, after correcting for the delay 87 in the master unit's transponder. Now in time slot #9, the follower unit #3 listens at its receiver 34 to detect the instant of actual arrival of the sync A pulse which was sent out by the master unit at the beginning of the time slot #9. As soon as this sync A pulse arrives on wire 81*a*, the counter 90 begins counting again and counts in enough pulses to complete the 1024 total count required to arrive at the end of time slot #9. It therefore necessarily follows that this time slot #9 actually does end in synchronism with the end of the master unit's #9 time slot, i.e., when the 1024th pulse has been counted by the error ring counter 90. At this point a synchronization signal labeled "fine" is delivered through wire 100 and wire 96*a* to reset the main ring counter 22 to zero, so that it will begin its next count at the correct beginning of time slot #1.

The box marked "zero error verification" and labeled 101 is connected to receive the last count $\overline{A13}$ from the main counter 22 and to receive the 1024th pulse through wire 96*a* from the framing error ring counter 90 and to compare their times of arrival. If they arrive simultaneously, a verification output is delivered along the wire 101*a* in order to turn-on the "green light" flipflop 102 and deliver an output along the wire 102*a* which verifies that the main ring counter 22 is in fact in synchronism with the count in the master unit, and this verification output along wire 102*a* is fed into the pulse coder 29 so as to enable this coder to deliver an output comprising the code II normal ranging signal from the #3 follower unit in its own time slot, this being the signal from which all of the other units in the system measure the slant range and the azimuth position of the follower unit #3. At the same time, output on wire 102*b* ceases and so pulse coder 28 is disabled. The unit #3 has thus returned to its ranging function from its synchronizing function.

On the other hand, if there is no coincidence between the $\overline{A13}$ count of the main ring counter 22 and the verification output on wire 26*a* from the error ring counter 90, no output appears on wire 102*a*, and the code II pulse coder 29 is disabled so that "follower" unit 3 cannot send out pulses marking its position under circumstances where its main ring counter 22 is out of step with the main counter 22 in the master. Every sync A pulse received on wire 81*a* and which is big enough to initiate a synchronization function turns the "green light" flipflop 102

"off," and if the synchronism is good, every verification output on wire 101*a* turns it back "on."

*Alternative correction by shifting oscillator*

The above-described means for actually correcting the time clock in each follower unit functions to correct the main ring counter 22 which is driven by an oscillator 20, but does not correct the oscillator 20 itself. In the present working embodiment the frequency which is delivered by the oscillator and the doubler to the main counter 22 is six-megacycles. Because of the fact that the counter performs its counting operations in discrete steps ⅙ of a microsecond apart, there is an inherent "granularity" due to the ⅙ microsecond steps which prevents perfect synchronization.

Figure 6:
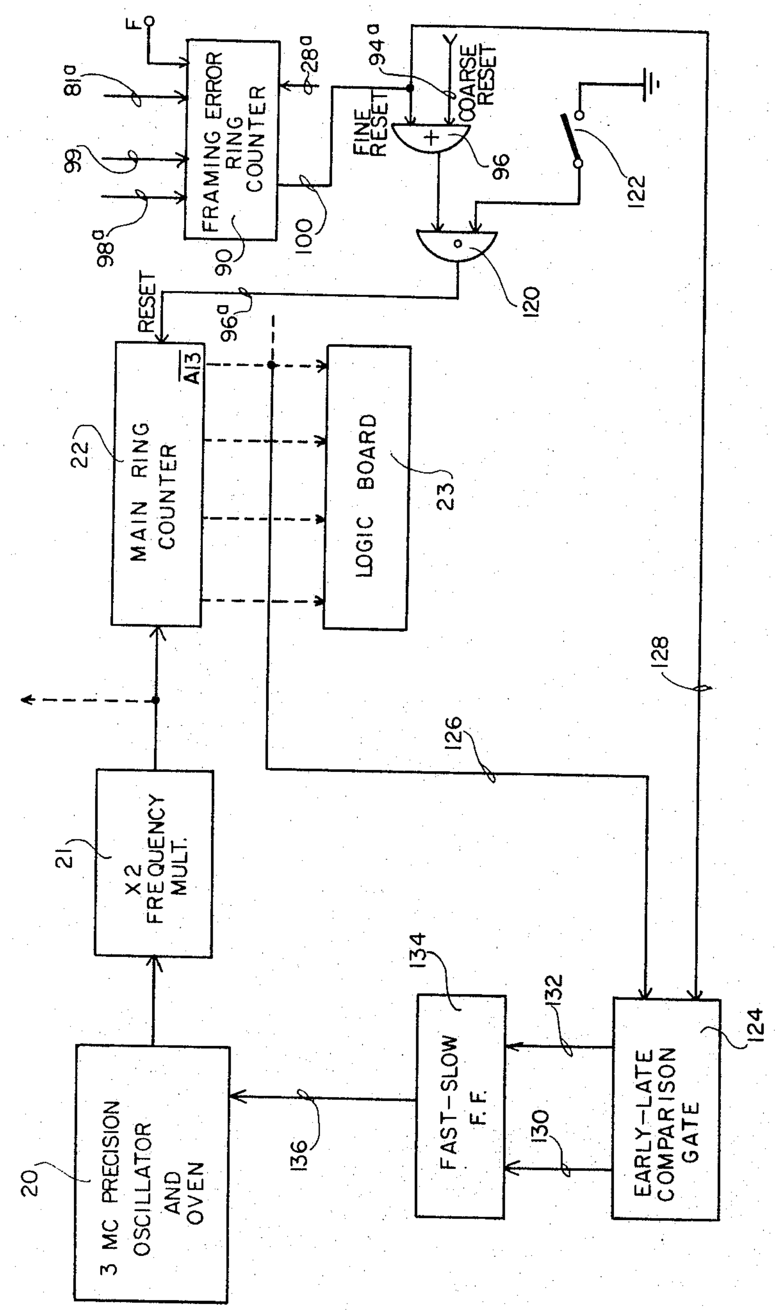
FIG. 6 is a block diagram showing a modified form of the invention with respect to correcting of the time clock errors, but otherwise comprising a partial copy of FIG. 2.

The modification shown in FIG. 6 adds to the system of FIG. 2 means for reducing the degree of "granularity" by delivering frequency control signals to the crystal oscillator 20 for the purpose of dragging its frequency toward zero error. Referring now to FIG. 6, the framing error ring counter still performs its normal function by issuing a fine reset signal periodically through the OR-gate 96 to reset the main ring counter 22. The coarse reset function on wire 94*a* is also preserved, these coarse and fine resets being highly useful when a system is first turned on in order to quickly bring all of the units into close synchronization with each other in the manner described above. Once this has been accomplished, then it becomes desirable to begin correcting the precision oscillator 20 itself instead of the counter 22.

After an initial synchronization has been accomplished through the OR-gate 96, any time clock errors which occur in the various follower clocks are attributable to the accumulated relative drifts of the follower clocks with respect to each other and to the master clock. These are relatively small errors, and can be corrected by dragging the frequency of each follower clock 20 in a direction which will decrease the error so that the clocks approach perfect synchronization with the master.

FIG. 6 shows a gate 120 interposed in the reset line 96*a* and controlled by a switch 122 so that the gate 120 can be blocked when the switch is closed, thereby interrupting the flow of reset pulses on line 96*a*. This interruption has the effect of preventing further "granular" corrections of the main ring counter 22. This switch 122 is employed to block the gate 120 when the system has become synchronized to as great an extent as possible using coarse and fine signals passing through the gate 96.

FIG. 6 shows a comparison gate 124 in which the time of arrival of the last pulse $\overline{A13}$ at the end of time slot #9 is compared with the time of arrival of the last count on wire 100 from the framing error ring counter 90, these outputs being respectively delivered to the comparison gate 124 on wires 126 and 128. The gate 124 delivers one of two different outputs, respectively on wire 130 if the pulse arriving on wire 128 is early with respect to the pulse arriving on wire 126; or the gate 124 issuing an output upon wire 132 if the pulse arriving on wire 128 is late as compared with the pulse arriving on wire 126. The output signals on wires 130 and 132 operate a "fast-slow" flipflop 134 which controls an output voltage on wire 136 which is delivered to the frequency control terminal of the oscillator 20. The correction voltage on wire 136 is small, and is of such magnitude as to drag the frequency of the oscillator 20 at a small accumulating rate. For example, if the fast-slow flipflop 134 remains in the "slow" position during a large number of consecutive synchronizing functions, over such a period of time the oscillator 20 can be dragged in such a direction as to decrease its phase substantially. If the flipflop 134 remains in "fast" position, the oscillator frequency is thereby increased. Moreover, since the amount by which the oscillator frequency can be changed by a voltage on wire 136 is small, about three parts in $10^8$ relative frequency change, when the oscillator 20 is substantially in perfect synchronization, an alternating distribution of "slow" and "fast" voltages from flipflop 134 will have very little effect on the oscillator 20 average frequency so that it will tend to remain stable. In other words, the correcting voltage applied on the wire 136 has little effect immediately, but the effect can accumulate when it operates in the same direction over a substantial number of cycles.

Although this invention has been illustrated in terms of particular embodiments, there are other modifications which would also perform satisfactorily. For example, measurements of transit time intervals have been made in this embodiment by accumulating digital values in an auxiliary counter 90. This counter could, however, be replaced by an integrating means in which analog values are inserted and accumulated.

Another modification could be made with respect to the way in which the error in a follower unit's main ring counter 22 is corrected. In the illustrated embodiment, the framing error counter in counted up to a first value representing the true range as shown at the bottom line of FIG. 4, and then this value is held or stored until a subsequent time slot when the master's sync A signal is actually received, at which time the count is continued to a second-value representing the actual end boundary of that time slot, and therefore the displacement of that boundary from the one determined by the follower unit's clock. An alternative way of accomplishing this purpose would be to accumulate a first digital or analog value representing the true range, and then during a subsequent time slot accumulate a second value representing a measured range to the master ending when the master's signal is received and commencing at the beginning boundary of the time slot in which the master transmits, but as measured according to a determination made by the follower's own time clock. If the second value is inversely combined with the first value, the resulting value represents the time error at the beginning boundary of that time slot and attributable to the follower unit's clock error.

It may be advantageous to use a combination of digital counting for coarse measurement plus analog accumulation for fine vernier correction.

The present invention is, therefore, not to be limited to the exact forms shown in the drawings, for obviously changes may be made therein within the scope of the following claims.

We claim:

1. In a system for measuring the range between multiple relatively movable transmitter and receiver units all having accurate time clocks including counters for determining a cyclic sequence of coinciding standardized time slots wherein each unit transmits a position-marking signal at the beginning of its own time slot and the other units receive the signal and determine transit time as measured by their own time clocks, means for occasionally synchronizing the time clocks in each unit selected as a follower unit with the time clock in one unit selected as the master unit, comprising:

(a) means for transmitting and receiving information between a follower unit and the master unit to determine the true range therebetween;

(b) auxiliary counting means in that follower unit for counting up an interval of time equal to said true range and holding the count;

(c) means in that follower unit for continuing the count of said counting means at the instant in a subsequent time slot in which a position-marking signal is received from the master unit and for ending the count when the total accumulated count equals the length of a standardized time slot; and (d) means for correcting the time clock in that follower unit in a direction to synchronize the end of a time slot as determined by the local clock counter with the arrival of the local auxiliary counting means at said total count.

2. In a system as set forth in claim 1, each auxiliary counting means including a counter for accumulating a total count equal to one time slot and then issuing a reset pulse at the final count, and each time-clock counter having a reset terminal for resetting it to a point in the time slot sequence representing the end of the time slot in which the master unit transmitted its position-marking signal; and means for applying the reset pulse to said terminal.

3. In a system as set forth in claim 1, the master unit having means for transmitting a position-marking signal in its transmitting time slot, and the follower units receiving the same; coarse reset gate means connected to the receiving means in each follower unit to reset its clock to the beginning of said transmitting time slot in response to one of the latter position-marking signals; and means to block said gate means for an interval during said master transmitting time slot when said position-marking signals should be received by the follower unit, provided its time clock is approximately synchronized to the master unit's time clock.

4. In a system as set forth in claim 1, said time clock including a clock oscillator driving said clock counter, said oscillator having means for controlling its rate of oscillation in the vicinity of its nominal frequency; and comparing means connected to the clock counter to receive a pulse at the end of said subsequent time slot and connected to the auxiliary counting means to receive another pulse when the latter has accumulated said total count, the comparing means comparing the times of arrival of said pulses and delivering to said controlling means a correcting signal comprising a small increment of correction after each comparison.

5. A system for occasionally synchronizing the time measuring instrument located in a follower unit with respect to a similar time measuring instrument located in a master unit where both instruments measure repeating time intervals of predetermined length, said system comprising:

(a) time clock means in each unit and substantially synchronized, and the clock means cyclically counting through the predetermined time intervals from start to end and then repeating;

(b) transmitter means in the master unit and connected for control by its clock means for initiating a transmitted signal at a fixed instant within a time interval, said instant coinciding with a similar fixed instant in the counting by the follower unit through its time intervals when the clock means are fully synchronized;

(c) receiver means in the follower unit for receiving the transmitted signal;

(d) means in the follower unit for occasionally measuring the actual wave transit time to the master unit as a measure of range thereto;

(e) auxiliary time measuring means in the follower unit connected to be controlled by said transit time measuring means for counting out a first accumulated count which is also proportional to the actual transit time of said signal transmitted to the follower unit over the distance of the measured range, and then halting the count;

(f) means connected to the receiver means and actuated thereby upon receipt of a subsequent master unit's transmitted signal to start the auxiliary means counting again to add a second count to the first accumulated count;

(g) means in the auxiliary means for marking the instant when the auxiliary means has accumulated a total count equalling the predetermined length of a cyclic time interval; and (h) means for correcting the clock means in the follower unit in a direction to substantially eliminate any discrepancy between said marked instant as determined by the auxiliary means and the instant when the clock means in the follower unit would count the end of the same time interval.

6. In a system as set forth in claim 5, the auxiliary means including a counter for accumulating a total count equal to one time interval and then issuing a reset pulse at the final count, and the follower clock means including a ring counter capable of counting complete time intervals and having a reset terminal for resetting the ring counter to a count representing the end of the time interval in which the master unit signal was transmitted; and means for applying the reset pulse to said terminal.

7. In a system as set forth in claim 5, said time clock means including a clock oscillator and a clock counter driven by said clock oscillator, said oscillator having means for controlling its rate of oscillation in the vicinity of its nominal frequency; comparing means connected to the clock counter to receive a pulse at said instant when the clock means would count the end of said time interval in which the master unit transmitted its signal, and connected to the auxiliary time measuring means to receive another pulse when the latter has accumulated said total count, the comparing means comparing the times of arrival of said pulses and delivering to said controlling means a correcting signal comprising a small increment of correction the sense of which increment depends upon the results of each comparison; and means for disabling said local clock means correcting means when said comparing means is operative.

8. A system for determining mutual ranges between plural relatively movable units, one of which is selected as a master unit and the others of which are follower units, and each unit being assigned to a unique time slot of predetermined length in a repeating cycle, the system comprising:

(a) a transmitter and a receiver in each unit tuned to a common frequency;

(b) time clock means in each unit and all substantially synchronized;

(c) means in each unit controlled by each clock means and connected to the local transmitter for initiating from each of the units a transmitted position-locating signal at a fixed instant within the assigned time slot for locating the position of that unit;

(d) one-way range determining means in each unit connected to its receiver and to its clock means for determining the range to each other unit during the latter's time slot by measuring the delay between the moment of reception of a transmitted signal from the other unit, and the instant of its transmittal according to the measuring unit's clock means;

(e) round-trip range measuring means in each follower unit for occasionally measuring the actual wave transit time to the master unit by transit-and-return wave technique;

(f) auxiliary time means in each follower unit and connected to said round-trip measuring means for counting out a first accumulated interval of time representing the accurate range to the master unit as measured by the measuring means;

(g) means connected to each follower receiver and operative during a time slot within which the master unit transmits for receiving the master unit's transmitted signal and thereupon starting the auxiliary means counting again to add a second interval of time to the first accumulated interval;

(h) means in the auxiliary means for marking the instant when the auxiliary means has accumulated a total count representing said predetermined length of a time slot; and (i) means for correcting the local clock means in the follower unit in a direction to substantially eliminate any discrepancy between said marked instant as determined by said auxiliary means and the instant when the local clock means would count the end of the time slot.

9. In a system as set forth in claim 8, multiple separate AGC memory means in each unit and respectively connected to adjust the receiver sensitivity to reject signals below an adjusted threshold during each corresponding assigned time slot; means for encoding each position-locating signal transmitted by a unit; means at the receiver of each unit for decoding received signals and for measuring signal intensity; means for re-establishing the AGC threshold level corresponding with each time slot according to the intensity of the strongest signals received in the corresponding time slot cycle.

10. In a system as set forth in claim 8, means in each unit for encoding the signals transmitted thereby; decoder means in each unit for distinguishing between properly encoded signals and non-coded signals; and gate means in each unit responsive to the receipt of encoded signals to block the decoder means from passing other coded signals for the remainder of the time slot in which they were received.

11. In a system as set forth in claim 8, means in each follower unit for interrogating the master unit; beacon transponder means in the master unit for replying thereto, and said round-trip range measuring means in each follower unit triggering an encoded response from the master unit; and each follower unit having means for reducing to one-half of the clock rate the counting rate of the auxiliary time measuring means while counting two-way transit time during said first accumulated interval.

12. In a system as set forth in claim 11, each auxiliary means including a counter for accumulating a total count equal to one time slot and then issuing a reset pulse at the final count, and each follower clock means including a ring counter capable of counting a complete cycle of time slots and having a reset terminal for resetting the ring counter to a point in the time slot cycle representing the end of the time slot in which the master unit just transmitted; and means for applying the reset pulse to said terminal.

13. A system for determining mutual azimuth and range positions between plural relatively movable units, one of which is selected as a master unit and the others of which are follower units, and each unit being assigned to a unique time slot of predetermined length in a repeating cycle, the system comprising:

(a) a transmitter and a receiver and antenna means coupled thereto in each unit and tuned to a common frequency;

(b) time clock means in each unit and all substantially synchronized;

(c) means in each unit controlled by each clock means and connected to the local transmitter for initiating from each of the units a transmitted position-locating signal at a fixed instant within its assigned time slot for locating the position of that unit;

(d) range determining means in each unit connected to its receiver and to its clock means and operative during a first mode in response to a position-locating signal from another unit to measure the signal transit time between the moment of arrival of said signal from the other unit, and the known instant of its transmittal according to the local clock means;

(e) round-trip range measuring means in each follower unit for occasionally operating in a second mode for accurately measuring the wave transit time to the master unit by interrogate-transpond techniques;

(f) auxiliary time means in each follower unit connected to said round-trip measuring means for counting out a first accumulated interval of time representing the accurate range to the master unit measured by two-way measuring means;

(g) means connected to each follower receiver and operative during a time slot within which the master unit transmits for receiving the master unit's transmitted signal and thereupon starting the auxiliary means counting again to add a second interval of time to the first accumulated interval;

(h) means in the auxiliary means for marking the instant when the auxiliary means has accumulated a total count representing said predetermined length of a time slot; and (i) means for correcting the local clock means in the follower unit in a direction to substantially eliminate any discrepancy between said marked instant as determined by said auxiliary means and the instant when the local clock means would count the end of the same time slot, including means for verifying said correction.

14. In a system as set forth in claim 13, each unit having an omnidirectional antenna and a directional antenna; antenna switching means for selectively coupling the antennas with the transmitter and the receiver, said switching means being controlled by the time clock in each unit for selecting the omnidirectional antenna during the time slot uniquely assigned to that unit for transmitting its own position-locating signal, and for selecting the directional antenna in time slots assigned to other units for that purpose.

15. In a system as set forth in claim 13, said repeating cycle including a time slot used for synchronizing the follower units, the master unit having means for transmitting a coded signal at the beginning of the synchronizing slot; and decoder means in each follower unit for decoding this signal and coupled to the auxiliary time measuring means to start the latter counting said second interval.

16. In a system as set forth in claim 15, each unit having a directional antenna and an omnidirectional antenna and having antenna switching means controlled by the local time clock means for selecting one of said antennas; circuit means in the master unit for connecting the antenna switching means to the time clock means for selecting the directional antenna during the synchronizing time slot; memory means in each follower unit for adjusting the local receiver to be sensitive to signals decoded during the synchronizing time slot and having an intensity level approximating the strongest signals recently decoded during that time slot, and having means for re-establishing the remembered level; and mode selecting means in each follower unit for enabling said round-trip measuring means to the exclusion of said range determining means in response to decoding of signals corresponding with said strongest signals, and for selecting the omnidirectional antenna during the synchronizing time slot.

17. In a system as set forth in claim 16, said mode selecting means comprising a flipflop having a first position enabling said range determining means and having a second position enabling said round-trip measuring means; said flipflop being controlled by said decoder means to energize the second position when a signal of suitable level is decoded and being controlled by said verifying means to energize said first position when correction is verified.

18. In a system as set forth in claim 15, flipflop means in each follower unit for disabling the transmission thereby of its position-locating signals, the flipflop being connected to the decoder means to be actuated to disable said transmission when coded signals are received from the master unit during the synchronizing slot, and being connected to the local time clock to enable said transmission when the local time clock means has been corrected.

19. In a system as set forth in claim 13, the master unit transmitting coded signals in its transmitting time slot, and each follower unit receiving and decoding these signals; coarse reset gate means connected to the receiver in each follower unit to reset its clock to the beginning of said transmitting time slot in response to a decoded signal; and means to block said gate means for an interval during said master transmitting time slot when said coded signals should be received by the follower unit if its time clock is approximately synchronized to the master unit's time clock.

20. In a system as set forth in claim 13, said time clock means including a clock oscillator and a main counter driven by said oscillator and having means for controlling its rate of oscillation in the vicinity of its nominal frequency; comparing means connected to the main counter to receive a pulse at said end of the last-mentioned time slot and connected to the auxiliary time measuring means to receive another pulse when the latter has accumulated said total count, the comparing means comparing the times of arrival of said pulses and delivering to said controlling means a correcting signal comprising a small increment of correction after each comparison; and means for disabling said local clock correcting means when said comparing means is operative.

21. In a system for measuring the range between multiple relatively movable transmitter and receiver units all having accurate time clocks determining a cyclic sequence of coinciding time slots wherein each unit transmits a signal at the beginning of its own time slot and the other units receive the signal and determine transit time as measured by their own time clocks, means for occasionally synchronizing the time clocks in each unit selected as a follower unit with the time clock in one unit selected as the master unit, comprising:

(a) transponder means for determining the true range from a follower unit to the master unit;

(b) means in that follower unit for accumulating a first value representing the length of time within the boundaries of one time slot that a signal propagated by the master unit would require for travelling to that follower unit over said true range, and for storing said first value until a subsequent time slot in which the master unit transmits;

(c) means in that follower unit for resuming said accumulation to add a second value during said subsequent time slot representing a length of time from the instant of actual receipt of the master unit's transmitted signal to a total accumulated value representing the length of one complete time slot; and (d) means responsive to attainment of the final accumulated value to reset the follower unit clock to concurrently end the local time slot corresponding with said subsequent slot.

22. A system for synchronizing the end of a certain time slot in a follower unit with the end of a corresponding time slot in a remotely located master unit where the master unit transmits a signal at the beginning of said corresponding time slot and the follower unit receives the signal during said certain slot, and the signal transit time between units has been accurately measured, comprising:

(a) counter means in the follower unit;

(b) means in the follower unit for entering into the counter means a first count representing said transit time, and holding that count;

(c) means in the follower unit for starting the counter means in response to receipt of said signal and for stopping it when the total accumulated count represents the full-slot length; and (d) means in the follower unit for resetting the end of said certain time slot to coincide with the instant of said total accumulated count.

No references cited.

RODNEY D. BENNETT, *Primary Examiner.*

CHESTER L. JUSTUS, *Examiner.*

T. H. TUBBESING, *Assistant Examiner.*